United States Patent [19]

Furomoto

[11] Patent Number: 4,648,566
[45] Date of Patent: Mar. 10, 1987

[54] SELECTABLE POSITIVE OR FRICTION DRIVE FOR A FISHING REEL

[75] Inventor: Yoshiyuki Furomoto, Sakai, Japan

[73] Assignee: Shimano Industrial Company Limited, Osaka, Japan

[21] Appl. No.: 752,812

[22] Filed: Jul. 8, 1985

[30] Foreign Application Priority Data

Jul. 11, 1984 [JP] Japan ............................ 59-145005

[51] Int. Cl.$^4$ ............................................ A01K 89/02
[52] U.S. Cl. ................................ 242/213; 192/67 R; 192/96; 242/215
[58] Field of Search ............. 242/211, 221; 192/53 R, 192/67 R, 67 P, 70.15, 70.24, 96; 74/369, 372, 412 TA, 665 D

[56] References Cited

U.S. PATENT DOCUMENTS

| | | | |
|---|---|---|---|
| 850,580 | 4/1907 | Holzmann | 242/213 |
| 3,104,850 | 9/1963 | Wood | 242/212 |
| 3,675,502 | 7/1972 | Sarah | 242/218 |
| 4,560,118 | 12/1985 | Weber et al. | 242/215 |

Primary Examiner—Billy S. Taylor
Attorney, Agent, or Firm—Stevens, Davis, Miller & Mosher

[57] ABSTRACT

A fishing reel is provided which includes a reel body with a pair of side frames, a spool mounted on a spool shaft disposed between the side frames, and a drive mechanism. The drive mechanism includes a drive shaft rotatably mounted relative to the side frames, a handle mounted on one end of the drive shaft, a pinion supported on the spool shaft to rotate and slide axially relative thereto, and a main gear rotatably mounted relative to the drive shaft and engageable with the pinion. The reel also includes a drag mechanism which includes a first transmission mechanism responsive to a driving force from the drive shaft to transmit an adjustable transmission force to the main gear. The reel also includes a second transmission mechanism mounted on the drive shaft and selectively engageable with the main gear to transmit the driving force from the drive shaft directly to the main gear independently of the first transmission means. An operating mechanism is provided for engaging the second transmission mechanism with the main gear. Thus, the reel includes a drag drive system which uses the drag mechanism and a direct drive system which bypasses the drag mechanism; the reel can be selectively switched from one to the other.

10 Claims, 8 Drawing Figures

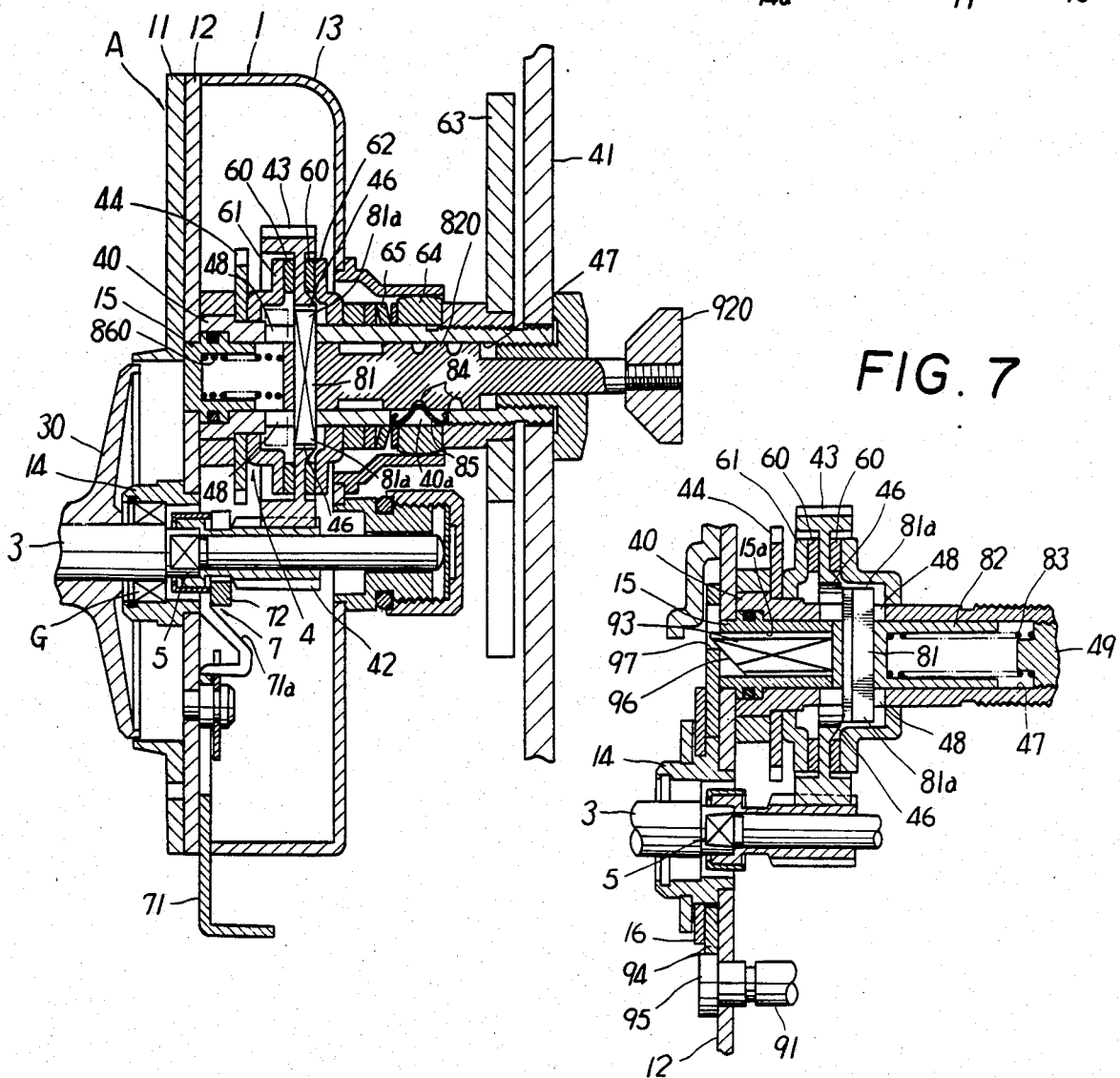

SELECTABLE POSITIVE OR FRICTION DRIVE FOR A FISHING REEL

FIELD OF THE INVENTION

This invention relates to a fishing reel, and more particularly to a fishing reel provided with a spool journalled on a spool shaft to a pair of side frames at a reel body, a drive mechanism including a handle, and a drag mechanism for applying an adjustable drag force against rotation of the spool, so that a driving force is transmitted from the handle to the spool through the drive mechanism and drag mechanism, thereby driving the spool to enable a fishing line to be wound thereon.

BACKGROUND OF THE INVENTION

The above described type of fishing reel is well-known as the double bearing fishing reel.

In such reels, when the fishing line is wound on the spool for fishing, the drag mechanism is used to adjust the transmitting torque of the spool to meet the proof stress of the line. When the spool is subjected to a load overcoming the transmitting torque, a main gear in association with the spool slips with respect to a drive shaft coupled with the handle, thereby preventing the line from being broken due to its undergoing a tension greater than the proof stress.

Generally, there are two methods for fishing. One is to use the drag mechanism to slip the main gear as described above and the other is to handle the fishing rod while playing the hooked fish so as to fish it up in a pulling fashion without using the drag mechanism, even when the line is subjected to a tension which exceeds its proof stress. The latter method is often used by expert anglers.

For the latter method, however, when using a fishing reel provided with a drag mechanism, even when the drag mechanism is adjusted to a maximum drag force, slippage occurs on the friction plate at the drag mechanism when the line is subjected to greater tension by a hooked fish, thereby creating a problem in that the aforesaid fishing method wherein the drag mechanism is not used cannot be adopted.

SUMMARY OF THE INVENTION

In light of the above problem, this invention has been designed. An object of the invention is to provide a fishing reel having a simple construction, wherein the drive is connected not merely through a drag mechanism provided in the reel, but also directly to a main gear, thereby enabling a hooked fish to be caught in a pulling-out fashion regardless of the magnitude of the pulling force exerted by the fish.

This invention is characterized in that the fishing reel is provided with a reel body having a pair of side frames; a spool disposed therebetween; a drive mechanism which drives the spool and which includes a pinion, a main gear for driving the pinion, a handle, and a drive shaft coupled therewith; and a drag mechanism which is provided between the drive shaft and the main gear to transmit a driving force adjustably from the drive shaft to the main gear. The drive shaft at the drive mechanism is provided with a transmission means engageable with the main gear to transmit the driving force from the drive shaft not through the drag mechanism but directly to the main gear. The transmission means is engageable and disengageable with and from the main gear, and an operating mechanism for the transmission means is provided at one side frame of the reel.

The transmission means preferably uses a pin-shaped actuator provided at the drive shaft such that it is movable axially thereof, the main gear being provided with engaging portions engageable with the actuator.

The operating mechanism is mounted on the drive shaft or the side frame supporting the drive shaft and is adapted to move the actuator axially of the drive shaft to engage with the main gear.

Thus, the driving force is transmitted from the drive shaft directly to the main gear by use of the actuator. Hence, the line can be wound up on the spool without a slip at the drag mechanism regardless of the amount of tension applied to the line to be wound, thereby enabling an angler to catch a hooked fish in a pulling-out fashion.

Moreover, since the actuator is engageable and disengageable with and from the main gear, the angler can select either one of two fishing modes, i.e., a direct drive of the main gear and a dragging drive of the same by use of the drag mechanism. Thus, if the angler is not an expert, he can use the dragging drive, thereby avoiding a careless breaking of the line.

The above and further objects and novel features of the invention will be more fully apparent from the following detailed description when read in connection with the accompanying drawings.

BRIEF DESCRIPTION OF THE DRAWINGS

FIG. 3 is an enlarged sectional view showing a relationship between a main gear and an actuator according to the invention, FIG. 4 is a perspective view of a clutch pin only, FIG. 5 is a perspective view of a cam shaft only, FIG. 6 is a partially omitted sectional view taken on the line VI—VI in FIG. 1, FIG. 7 is a view illustrating an operating condition of the FIG. 1 embodiment, and FIG. 8 is a partially omitted sectional view of a modified embodiment of the invention.

DETAILED DESCRIPTION OF THE INVENTION

Figure 1:
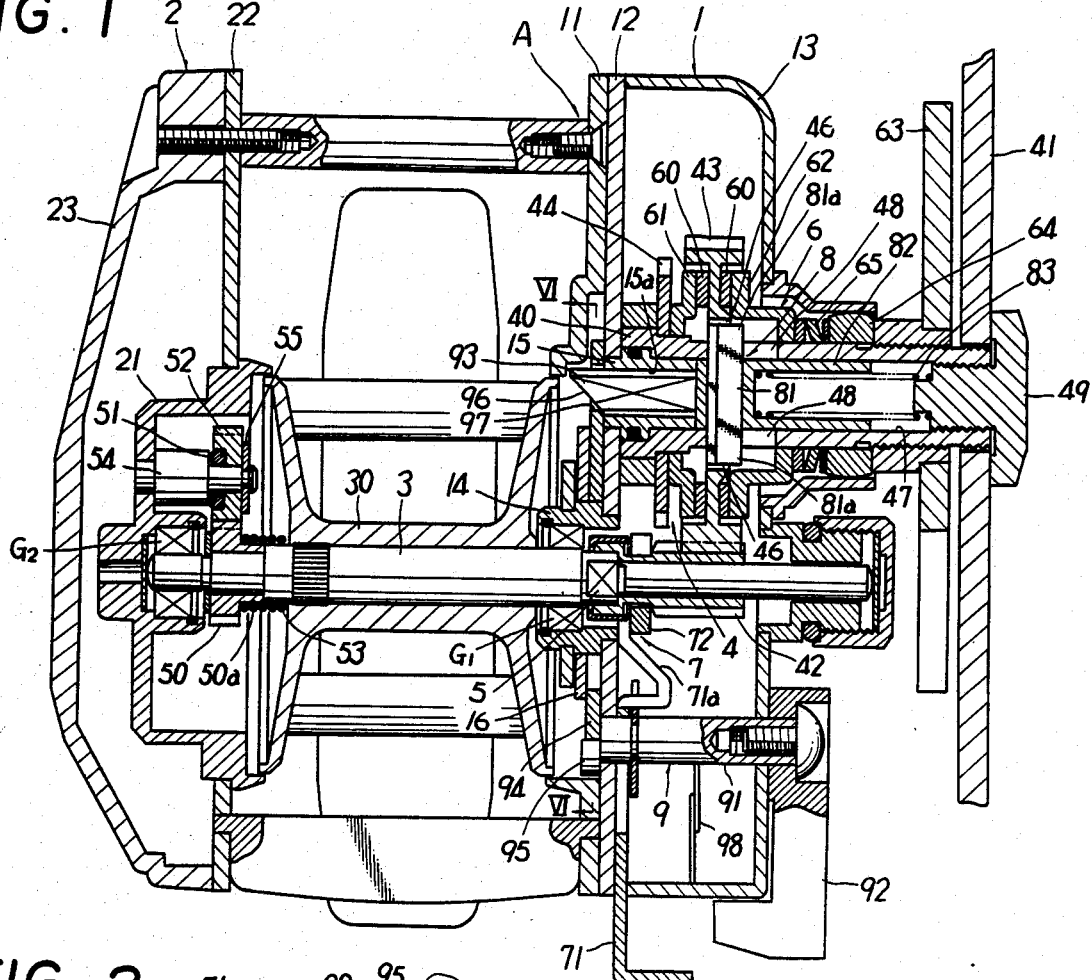
FIG. 1 is a cross sectional view of an embodiment of a fishing reel of the invention.

A typical embodiment of a fishing reel of the invention is shown in FIG. 1, which is provided with a reel body A having a pair of side frames opposite to each other and spaced at a predetermined interval therebetween. A first side frame 1 comprises a side plate 11, a doubling plate 12 attached to the outside of the side plate 11 and having at its center a bearing cylinder 14, and a cup-like-shaped cover 13. A second side frame 2 comprises a side plate 22 having at its center a bearing housing 21 and a cup-like-shaped cover 23 attached to the outside of the side plate 22.

The bearing cylinder 14 and bearing housing 21 at side frames 1 and 2 are provided with bearings $G_1$ and $G_2$ respectively, through which a spool shaft 3 for spool 30 is journalled to the side frames 1 and 2. A tubular support shaft 15 is mounted on the doubling plate 12 at the first side frame 1, and a drive shaft 40 is sleeved rotatably onto the support shaft 15 and projects at one end outwardly from the first side frame 1, the projecting end supporting a handle 41. A driving force from the rotating handle 41 is transmitted to the spool shaft 3 through the drive shaft 40, a drag mechanism 6 and a drive mechanism 4, thereby driving the spool 30. A clutch lever 71 at a clutch operating mechanism 7 allows a clutch means 5 to engage or disengage spool 30 and its shaft 3 from drive shaft 40. Clutch means 5 disengages to allow spool 30 to rotate freely and engages to drive the spool 30 by the driving force from the handle 41.

The clutch means 5 comprises flat portions provided at an intermediate portion of the spool shaft 3 and a cylinder having non-round inner surfaces engageable with the flat surface at the spool shaft 3 and provided at a pinion 42 supported rotatably and axially slidably to the spool shaft 3. The clutch lever 71 moves forwardly to move the pinion 42 so as to disengage from the flat surfaces, thereby enabling the spool shaft 3 and spool 30 fixed thereto to freely rotate.

The drive mechanism 4 comprises the drive shaft 40, handle 41, pinion 42, and a main gear 43 engageable therewith and supported rotatably to the entering portion of drive shaft 40 into the first side frame. A driving force from the rotating handle 41 is transmitted from the drive shaft 40 to the main gear 43 through a drag mechanism to be discussed below and then from the main gear 43 to the spool shaft 3 through the pinion 42 and the clutch means 5 provided between the pinion 42 and the spool shaft 3, thereby driving the spool 30. In addition, a stopper gear 44 is fixed to the drive shaft 40 and always engages with a stopper pawl 45 pivoted to the doubling plate 12 at the first side frame 1 to thereby restrain the drive shaft 40 from reverse rotation. The stopper gear 44 and stopper 45, however, are not indispensable.

The drag mechanism 6 comprises a pair of first and second drag washers 61 and 62, drag washers 61 and 62 having friction plates 60 and being disposed at both sides of the main gear 43, a drag lever 63 interposed between the second drag washer 62 and the handle 41, and a washer 64 and a leaf spring 65 interposed between the drag lever 63 and the second drag washer 62. First and second drag washers 61 and 62 are supported non-rotatably but axially movably to the drive shaft 40. Drag lever 63 screws therewith and is rotated to axially move the second drag washer 62 to press-contact the friction plates 60 with the main gear 43 so that a driving force is transmitted from the drive shaft 40 to the main gear 43 in a predetermined transmitting torque through the second drag washer 62 and friction plate 60. Friction plates 60 each have an adjustable press-contact force the magnitude of which is determined by the drag lever 63 so that the main gear 43 is adapted to slidably rotate when subjected to a load overcoming the adjusted transmitting torque.

The clutch operating mechanism 7 comprises a clutch yoke 72 holding the pinion 42 to urge clutch means 5 in the direction of engagement, and a furcate clutch lever 71 having an urging portion 71a to urge the clutch yoke 72. Clutch lever 71 is supported to the doubling plate 12 such that it can move in reciprocation perpendicularly to the spool shaft 3. The clutch lever 71 is moved forwardly and the clutch yoke 72 is moved axially of the spool shaft 3, whereby the pinion 42 is moved in the direction of disconnecting the clutch means 5, and clutch lever 71 is moved backwardly to move the clutch means 5 by an urging force of the clutch yoke 72 in the direction of engaging the clutch means 5.

In the embodiment of the invention shown in FIGS. 1 through 7, the main gear 43 is provided with engaging recesses 46 and the drive shaft 40 supports axially rotatably an actuator 8 engageable and disengageable with and from the engaging recesses 46. Recesses 46 and actuator 8 constitute a transmission means for transmitting the driving force from the drive shaft 40 directly to the main gear 43. Also, the first side frame 1 is provided with an operating mechanism 9 for the actuator 8.

In the aforesaid construction, two engaging recesses 46 are formed at the inner surface of the center bore of the main gear 43 at a phase difference of 180°. The actuator 8 comprises a clutch pin 81 having at both lengthwise ends engaging portions 81a engageable with the engaging portions 46, and a holder 82 supporting the clutch pin 81. The holder 82 is inserted axially movably into a guide bore 47 provided at the central portion of drive shaft 40. Elongate slots 48, which are open at the guide bore 47 and extend axially of drive shaft 40, are provided at the drive shaft 40. Engaging portions 81a project outwardly through the slots 48 respectively.

Between one end of the holder 82 and an end member 49 screwing therewith is inserted a coiled spring 83 for biasing the actuator 8 in the direction of always engaging the engaging portions 81a with the engaging recesses 46 respectively. Also, the clutch pin 81, as shown in FIGS. 3 and 4, is cut out slantwise at both sides of the surface opposite to the engaging recesses 46 so as to facilitate engagement therewith. In addition, the aforesaid cutouts are not indispensable, but alternatively need only be rounded at both side corners. Also, the holder 82 is provided with holding bores corresponding to the sectional shape of clutch pin 81.

The operating mechanism 9 for the actuator 8 comprises an operating lever 92 having a lever shaft 91 and an association means for allowing the operating lever 92 to operate in association with the transmission means comprising the actuator 8, i.e., to engage transmission means 8 with main gear 43. The association means in the aforesaid embodiment comprises a cam shaft 93 abutting against the other end of the holder 82 and an association plate 94 interposed between the operating lever 92 and the cam shaft 93 so as to transmit the motion of operating lever 92 to the cam shaft 93. The lever shaft 91 is supported rotatably between the doubling plate 12 and the cap-like-shaped cover 13. Associate plate 94 is interposed radially slidably between the doubling plate 12 and a guide plate 16 disposed inside the doubling plate 12. Cam shaft 93 is supported only axially movably within a through bore 15a provided at the center of the support shaft 15.

At the utmost end of lever shaft 91 is provided a semicircular cam 95 engageable with the edge of the associate plate 94 so that the operating lever 92 is rotated to slide the associate plate 94. Cam shaft 93 is provided at one end with a slanted cam face 96, and the associate plate 94 is provided with an engaging bore 97 engageable with the cam face 96, whereby the associate plate 94 slides to forcibly move cam shaft 93 in an axial direction, and the holder 82 is actuated against the coiled spring 83.

Between the lever shaft 91 and the cup-shaped cover 13 is interposed a torsion spring 98 for maintaining the operating position of operating lever 92, and a return spring 99 is interposed between the spring seats 94a and 16a provided at the associate plate 94 and guide plate 16 respectively.

At the central portion of associate plate 94 is provided an elliptic bore 94b. The outer surface of cam shaft 93 and the inner surface of the through bore 15a at the support shaft 15 each have a non-round shape having axially extending flat surfaces so that the cam shaft 93 is restrained from rotation relative to the support shaft 15 but is supported axially movably relative thereto.

In addition, the fishing reel shown in the drawing has a brake mechanism between the spool shaft 3 and the bearing housing 21.

The brake mechanism comprises a first gear 50 having a tubular shaft 50a, a second gear 52 having a rubber O-ring 51 and engageable with the first gear 50, and a coiled clutch spring 53 actuated by rotation of the spool shaft 3. First gear 50 is supported rotatably to the spool shaft 3. Second gear 52 is supported rotatably to a shaft 54 projecting from the bearing housing 21 so that the O-ring 51 applies a predetermined rotational resistance to the second gear 52. The clutch spring 53 is wound slidably onto the tubular shaft 50a and spool shaft 3 so that when the line is drawn out from the spool 30 by a hooked fish, i.e., when the spool shaft 3 reversely rotates, the tubular shaft 50a and spool shaft 3 cause clutch spring 53 to wind tightly. Hence, the reverse torque of spool shaft 3 acts on the O-ring 51 through the first and second gears 50 and 52 to apply a predetermined resistance against reverse rotation of spool shaft 3, thereby preventing the line from being loosened. On the other hand, when the spool shaft 3 normally rotates to wind the line onto the spool 30, a slip is caused between the clutch spring 53 and the spool shaft 3 and tubular shaft 50a to rotate the spool shaft 3 with respect to the first gear 50.

In addition, the O-ring 51 is elastically deformed by a snap ring 55 mounted on the utmost end of shaft 54, which may alternatively be supported by an adjusting nut screwing with the same.

When the fishing reel of the invention constructed as described above is used for fishing, the clutch lever 71 is moved forwardly to disconnect the clutch 5 to keep the spool 30 freely rotatable and to enable the line to be drawn out therefrom.

Figure 2:
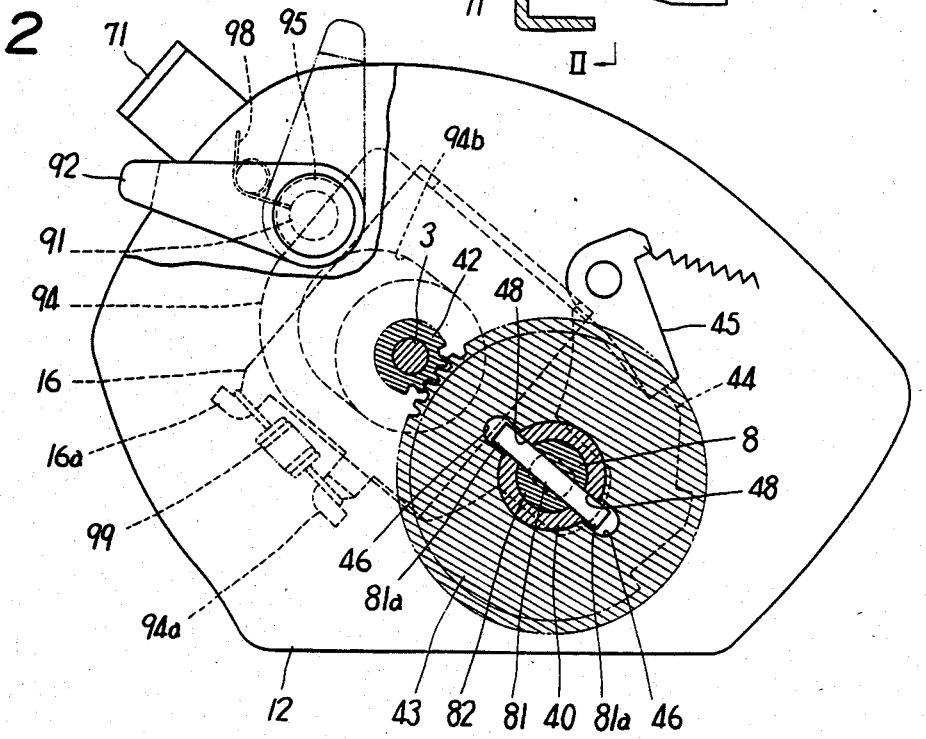
FIG. 2 is a sectional view taken on the line II—II in FIG. 1.

The clutch lever 71, after the line is drawn out, is moved backwardly to engage the clutch 5 to set the line winding stage, and the operating lever 92, as shown by the chain line in FIG. 2, is positioned in a drag stage. Clutch pin 81 engages with the main gear 43 to put the drag mechanism 6 in its operating condition for catching a hooked fish.

Also, the handle 41 is turned to transmit its driving force from the drive shaft 40 to the spool shaft 3 through the drag mechanism 6, main gear 43, pinion 42 and clutch means 5, thereby rotating the spool 30 to wind up the line thereon.

When the hooked fish is large and pulls the line with a force which overcomes the transmitting torque set by the drag mechanism 6 during the winding of the line, the main gear 43 slips with respect to the drive shaft 40 to restrain the line from being wound, thereby avoiding breaking of the line.

In this condition, when the handle 41 stops rotating, the spool 30 is pulled by the hooked fish and tends to rotate in reverse. In such case, however, since the embodiment in FIG. 1 is provided at the drive shaft 40 with the stopper gear 44, the reverse torque, when smaller than the transmitting torque adjusted by the drag mechanism 6, acts on the spool 30, spool shaft 3, clutch means 5, pinion 42, main gear 43, drag mechanism 6, and stopper gear 44, thereby restraining by the stopper pawl 45 thereof the reverse rotation of the spool 30. Hence, reverse rotation of the spool 30 resulting from tension in the line is prevented and the line is not drawn out from the spool 30.

On the other hand, in a situation where the hooked fish pulls the line by a force overcoming the drag force set by the drag mechanism 6, the main gear 43 rotates while slipping so that the spool 30 reversely rotates under the rotational resistance corresponding to the drag force.

The fishing reel of the present invention uses drag mechanism 6 such that, when the pulling force of the hooked fish is larger than the transmitting torque set by the drag mechanism 6, the driving force to the spool 30 is cut off and, after the fish's pulling force decreases, the fish is brought in. The fishing reel of the invention, however, even when the pulling force of the hooked fish overcomes the proof stress of the line, can be used to catch the hooked fish in a pulling-out fashion without utilizing the drag mechanism 6. In this case, the angler operates the operating lever 92 to switch the reel to the mode wherein drag mechanism 6 is not used.

In detail, the operating lever 92 is turned to move the associate plate 94 downwardly in FIG. 1, so that the cam shaft 93 and the holder 82 at the actuator 8 move leftwardly in FIG. 1 due to the bias of coiled spring 83 and the clutch pin 81 engages with the engaging recesses 46 at the main gear 43, thereby keeping the main gear 43 and drive shaft 40 in a direct connection condition to transmit the driving force from the handle 40 directly to the main gear 43. Accordingly, the angler, even when the hooked fish is large, can play the fish in a pulling-out fashion.

Alternatively, the main gear 43 may include projections and the actuator 8 may include engaging recesses engageable with the projections. Thus, the main gear 43 and actuator 8 are not limited or defined with respect to their engaging construction, and the actuator 8 is not limited in its construction.

Alternatively, the operating mechanism may be constructed as shown in FIG. 8, in which a sliding member 820, which is supported slidably into the drive shaft 40 and holds the clutch pin 81, may project at one end outwardly from guide bore 47 to provide at its projecting end an operating member 920. Thus, the operating mechanism is not particularly defined or limited.

It should be noted that, in the modified embodiment in FIG. 8, two positioning grooves 84 are provided at the outer periphery of a holder 820 and the drive shaft 40 is provided with a window 40a, into which a positioning spring 85 engageable with each positioning groove 84 is held, thereby maintaining actuator 8 in the operating position. Also, a return spring 860 is interposed between the support shaft 15 which supports the drive shaft 40, and the holder 820.

In addition, in the aforesaid embodiments, although a reel provided with the clutch means 5 is described, clutch means 5 is not indispensable.

Although several embodiments have been described, they are merely exemplary of the invention and not to be construed as limiting, the invention being defined solely by the appended claims.

What is claimed is:
1. A fishing reel, comprising:
a reel body with a pair of side frames, a spool mounted on a spool shaft disposed between said side frames, a driving mechanism including a drive shaft rotatably mounted relative to said side frames, a handle mounted on one end of said drive shaft, a pinion supported on said spool shaft to rotate and slide axially relative thereto, and a main gear rotatably mounted relative to said drive shaft and engageable with said pinion, a drag mechanism comprising first transmission means, responsive to a driving force from said drive shaft, for transmitting an adjustable transmission force to said main gear, a second transmission means mounted on said drive shaft and selectively engageable with said main gear to transmit said driving force from said drive shaft directly to said main gear independently of said first transmission means, and an operating mechanism for engaging said second transmission means with said main gear, said operating mechanism being mounted on said reel body.

2. A fishing reel according to claim 1, wherein said second transmission means comprises an actuator projecting radially outwardly from an outer periphery of said drive shaft and supported on said drive shaft to be movable axially relative thereto, said main gear comprising engaging portions engageable with said actuator.

3. A fishing reel according to claim 2, wherein said actuator comprises a pin having a length which is greater than a diameter of said drive shaft and a holder supported on said drive shaft to be axially movable relative thereto, said holder for supporting said pin.

4. A fishing reel according to claim 2, further comprising a spring for biasing said actuator toward said engaging portions at said main gear.

5. A fishing reel according to claim 1, wherein said operating mechanism comprises an operating lever supported to a said side frame which supports said drive shaft, and engagement means for mechanically connecting said operating lever and said second transmission means to enable said operating lever to engage said second transmission means with said main gear.

6. A fishing reel according to claim 5, wherein said engagement means comprises a plate member which is slidable responsive to operation of said operating lever and a cam means having a cam face engaged with said plate member and a shaft supported to said drive shaft, said cam means being axially movable responsive to sliding of said plate member, said cam shaft being engaged with said second transmission means.

7. A fishing reel according to claim 1, wherein said operating mechanism comprises a sliding member supported axially slidable relative to said drive shaft and an operating member projecting outwardly from an axial end of said drive shaft, said sliding member comprising said transmission means.

8. A fishing reel according to claim 7, wherein a positioning mechanism is disposed between said sliding member and said drive shaft, said positioning mechanism comprising means for setting and maintaining an axial position of said sliding member with respect to said drive shaft.

9. A fishing reel according to claim 4, wherein said holder and said spring are at least partially disposed in a hollow interior portion of said drive shaft.

10. A fishing reel according to claim 1, wherein said operating mechanism is mounted on one of said side frames.

* * * * *